United States Patent Office 2,889,113
Patented June 2, 1959

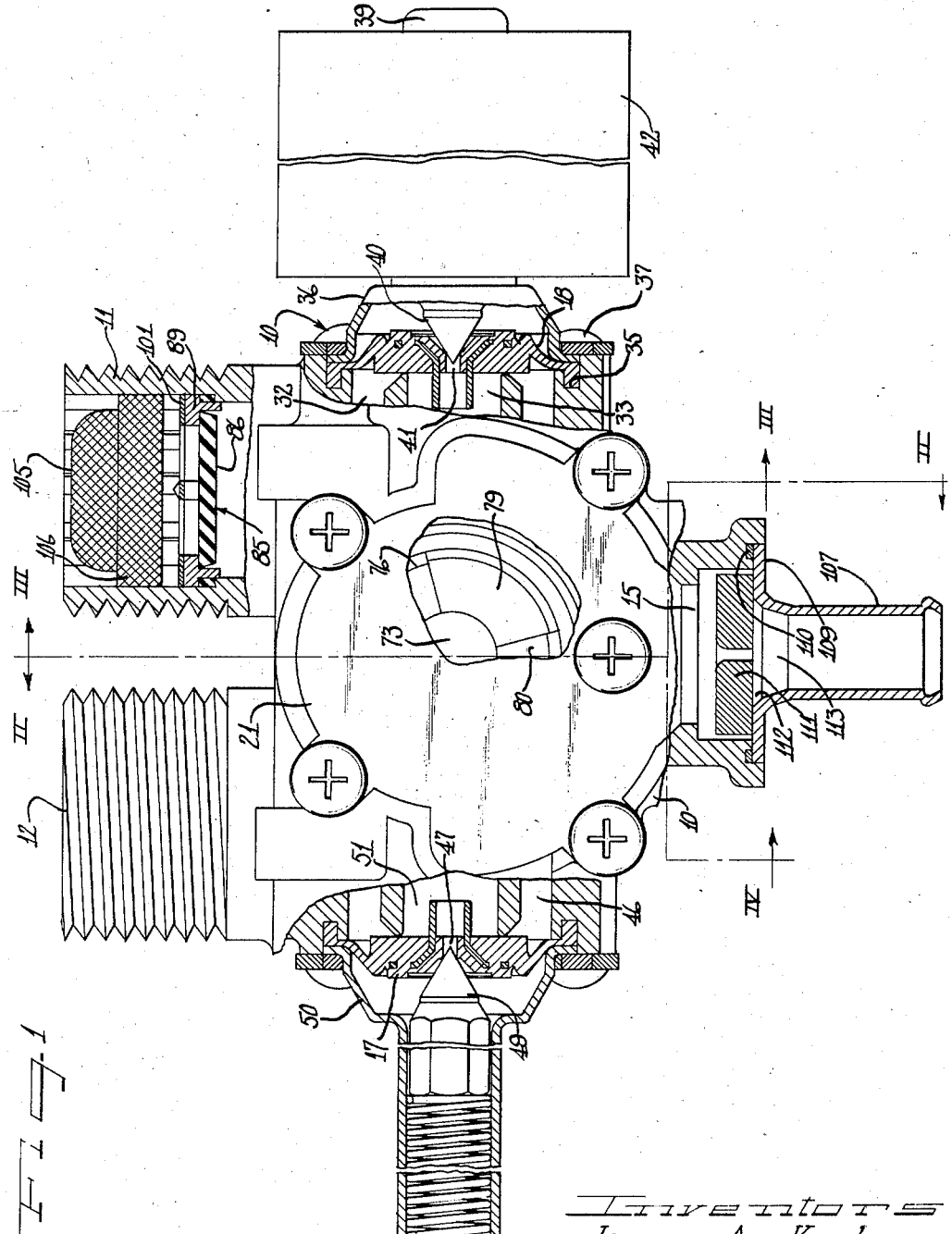

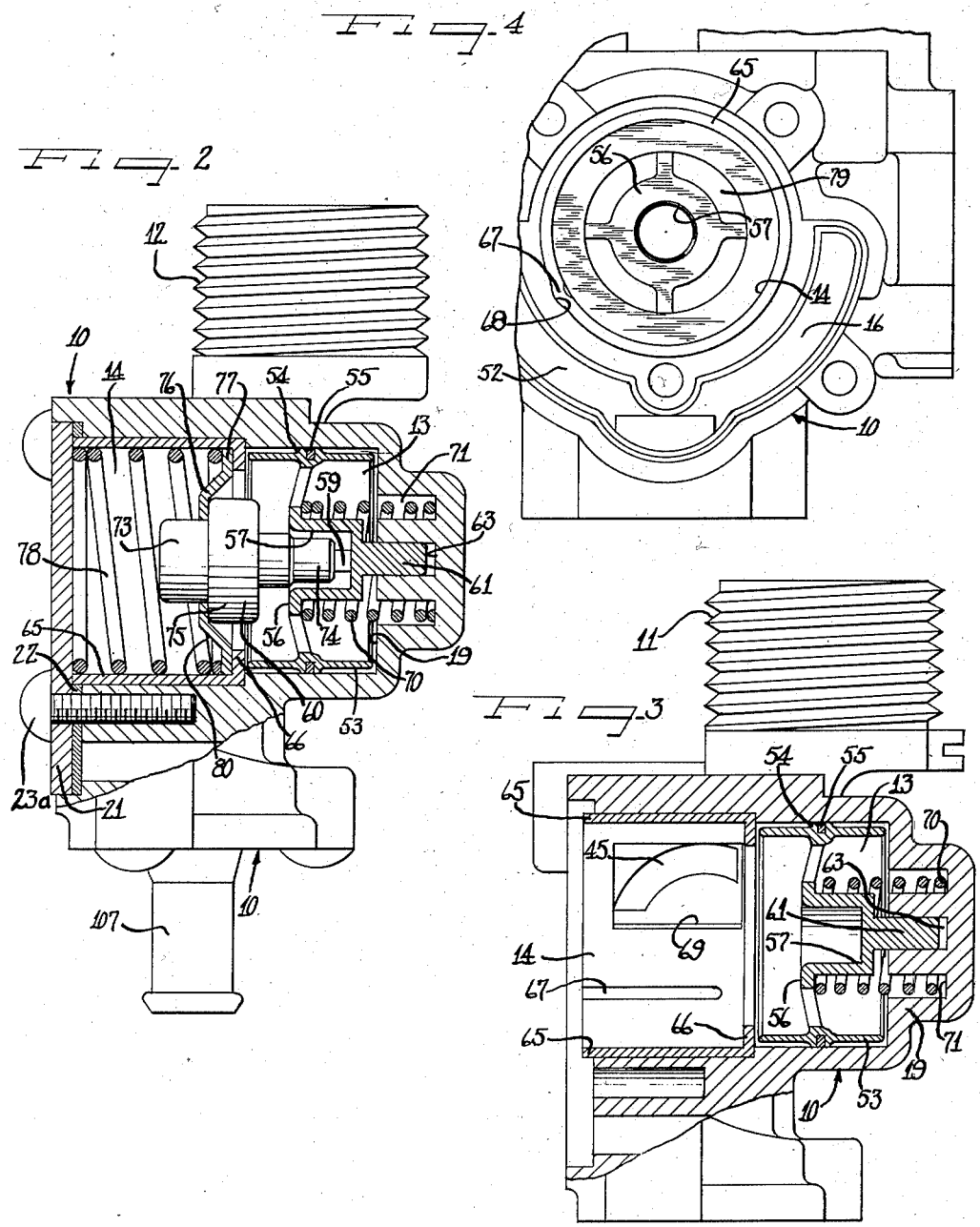

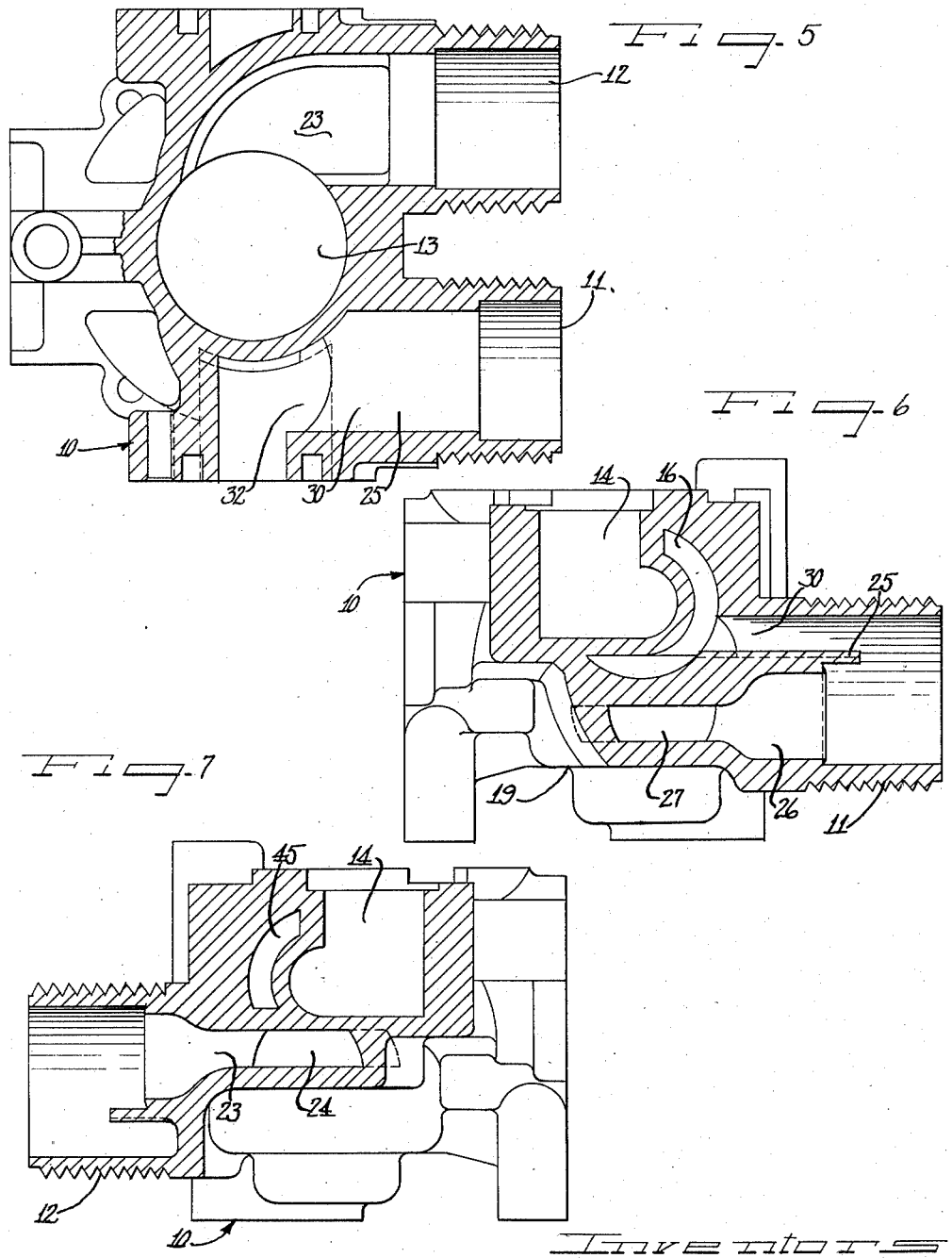

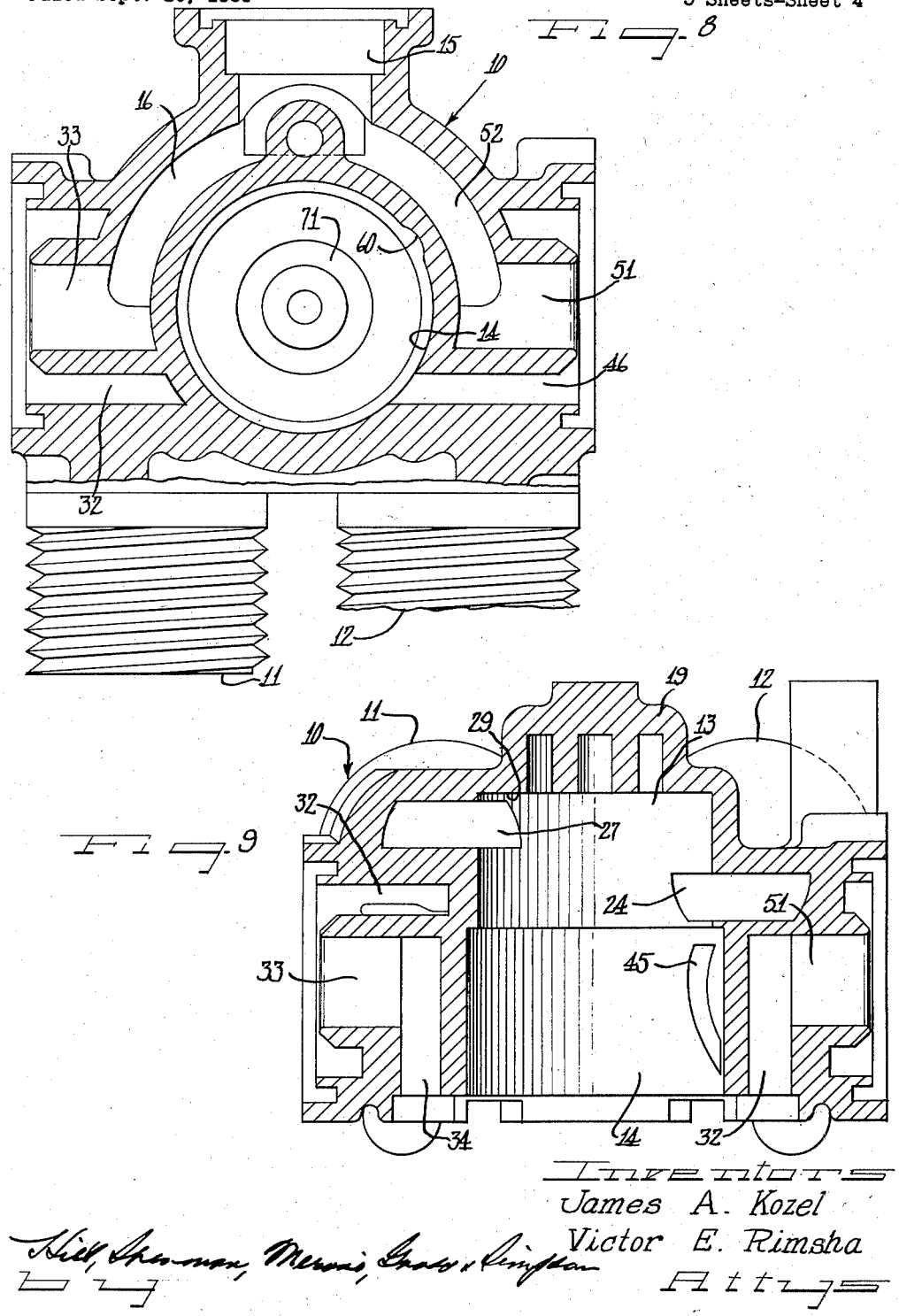

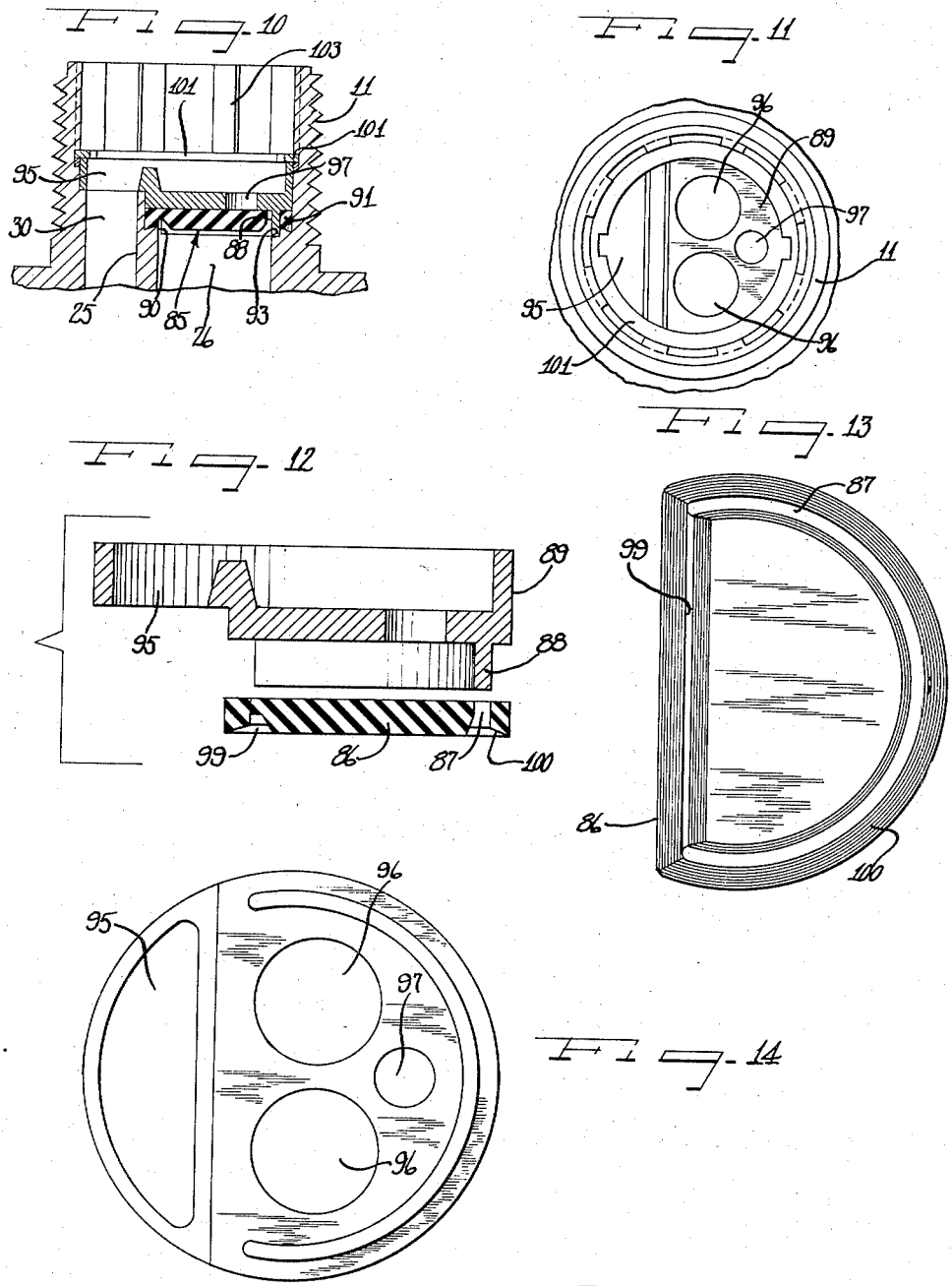

2,889,113

THERMOSTATICALLY CONTROLLED MIXING VALVE

James A. Kozel, Chicago, and Victor E. Rimsha, Evanston, Ill., assignors to The Dole Valve Company, Chicago, Ill., a corporation of Illinois Application September 18, 1953, Serial No. 380,952

4 Claims. (Cl. 236—12)

This invention relates to improvements in thermostatically controlled fluid mixing valves for mixing hot and cold water and delivering hot water or a tempered water at a predetermined intermediate temperature.

A principal object of our invention is to provide a new and improved fluid mixing valve for hot and cold water arranged with a view toward utmost compactness and efficiency in operation.

Another object of our invention is to provide a mixing valve controlled by a thermostat and having a one piece valve casing suitable for manufacture from one of the well known thermoplastic materials.

Another object of our invention is to provide a mixing valve having a metering chamber and a mixing chamber in communication therewith, with hot and cold water inlets leading directly into the metering chamber and a thermostatically controlled valve controlling the passage of hot and cold water into the mixing chamber, together with other valve means controlling the passage of mixed water through the outlet of the valve.

Another object of our invention is to provide a novel form of thermostatically controlled one-piece mixing valve body having a hot water passageway by-passing the mixing chamber, and hot and cold water inlets leading directly into the mixing chamber, wherein the hot water inlet is arranged to pass fluid directly into the mixing chamber and the hot water by-pass passageway.

Still another object of our invention is to provide a novel and improved form of mixing valve having a central mixing chamber with hot and cold water inlets leading into the mixing chamber and metered thereto by a thermostatically controlled valve element, and having one valve controlling the discharge of mixed water from the mixing chamber and a second valve controlling the by-pass of hot water past the mixing chamber.

A further object of our invention is to provide a novel and improved form of thermostatically operated valve for metering the flow of hot and cold water into a mixing chamber, in which the retainer for the thermostatic element serves as a flow baffle, to pass the mixed water over the thermostatic element.

Still another object of our invention is to provide a new and improved form of mixing valve having a piston valve metering hot and cold water into a mixing chamber, with a power-type of thermostatic element controlling movement of the metering valve, in which the retainer for the thermostatic element serves as a flow baffle directing the mixed hot and cold water to flow over the thermostatic element and also serves as an over-travel guide for the thermostatic element.

Another and important object of our invention is to provide a new and improved form of mixing valve having a piston-type of metering valve controlled by a thermostatic element, for metering hot and cold water into a mixing chamber and biased into engagement with the thermostatic element by a spring and in which an over-travel spring acting in opposed relation with respect to the biasing spring is mounted in the mixing chamber and retains the thermostatic element therein.

A still further object of our invention is to provide a mixing valve of a more efficient construction than formerly in which the hot and cold water inlets enter directly into a metering chamber in different planes, and a thermostatically controlled piston valve meters the hot and cold water into the mixing chamber, and wherein the seal for the piston valve separates the hot and cold water inlets from each other.

Still another object of our invention is to provide a new and improved form of check valve of the wafer type, wherein the check valve serves as a seal for the seat for the valve.

These and other objects of our invention will appear from time to time as the following specification proceeds and with reference to the accompanying drawings wherein:

Figure 1 is a top plan view of a mixing valve constructed in accordance with our invention, with a part of the top cover thereof broken away and with other parts broken away and shown in section, in order to illustrate certain details of construction of the valve.

Figure 2 is a fragmentary sectional view taken substantially along the line II—II of Figure 1;

Figure 3 is a fragmentary sectional view taken substantially along the line III—III of Figure 1;

Figure 4 is a fragmentary plan view of the mixing valve with the top cover removed;

Figure 5 is a horizontal sectional view taken through the valve body and showing the passageways from the hot and cold water inlets into the valve body;

Figure 6 is a vertical sectional view taken through the hot water inlet and showing the passageway from the hot water inlet into the metering chamber of the valve, and also showing the hot water by-pass passageway, by-passing the mixing chamber;

Figure 7 is a vertical sectional view taken through the valve body, showing the cold water inlet into the metering chamber and also showing the mixed water outlet from the mixing chamber;

Figure 8 is a horizontal sectional view taken through the mixing chamber of the valve body, showing the mixed water outlet from the mixing chamber through one end of the valve body and also showing the hot water outlet through the by-pass passageway, by-passing the mixing chamber;

Figure 9 is a transverse sectional view taken through the valve with the valve body inverted from the position shown in Figures 2 and 3 and showing the hot and cold water inlets directly into the metering chamber of the valve;

Figure 10 is a transverse sectional view taken through the hot water inlet and showing in detail the check valve and seat frame therefor;

Figure 11 is a fragmentary end view looking into the hot water inlet, in order to show certain details of the seat frame and retainer for the check valve not shown in Figure 10;

Figure 12 is an exploded view of the seat frame and check valve;

Figure 13 is a bottom plan view of the check valve; and

Figure 14 is an enlarged bottom plan view of the seat frame for the check valve.

As shown on the drawings:

In the embodiment of our invention illustrated in the drawings, the valve is shown as comprising a valve body 10 having hot and cold water inlets 11 and 12, respectively, leading into a metering chamber 13, and having a central aligned mixing chamber 14 communicating therewith. The valve body 10 is also shown as opening to opposite sides of the wall of said mixing chamber for the passage of mixed water from said mixing chamber through an outlet 15, and for the by-pass of hot water around said mixing chamber through a by-pass passageway 16, under the control of valves 17 and 18, respectively, herein shown as being fluid pressure operated solenoid controlled diaphragm valves.

The valve body may be molded from one of many of the well known forms of thermoplastic materials. One such material, which has been found to be extremely satisfactory for such a valve, is a "nylon" thermoplastic material which may readily be molded to the desired form and will be practically unaffected by the heat of the hot water.

The metering chamber 13 is shown as being closed at one end by an end wall 19 of the valve body, and as communicating directly with the mixing chamber 14 which is shown as forming a continuation thereof. The opposite end of the mixing chamber 14 from the metering chamber 13 is shown as being closed by a cover 21 recessed within the valve body so as to be substantially flush therewith and sealed thereto by a gasket 22, encircling said mixing chamber. The cover 21 is shown as being retained to the valve body by screws 23a threaded therein, which may be self-tapping screws.

The cold water inlet 12 is shown in Figures 5, 7 and 9 as communicating with a passageway 23 leading into the metering chamber 13 through a port 24, shown as being adjacent the mixing chamber 14.

The hot water inlet 11 is shown as having a partition or wall 25 therein, one side of which defines a passageway 26 leading into the metering chamber 13 through a port 27, entering said metering chamber in vertically spaced relation with respect to the port 24 and shown as being located adjacent the end wall 19 of said metering chamber. The opposite side of the partition 25 from the passageway 26 defines a passageway 30 communicating with a hot water by-pass passageway 31 (see Fig. 6) leading to a passageway 32 on the intake side of the pressure operated solenoid controlled diaphragm valve 18. An outlet passageway 33 for said valve communicates with a by-pass passageway 34, leading to the outlet 15, for discharging hot water through said outlet when the valve 18 is open.

The diaphragm valve 18 is shown as having sealing engagement at its periphery, with the open end portion of the valve body in an annular groove 35 formed in said valve body around the passageway 32. A closure cap 36 abuts the outer side of the diaphragm valve 18 adjacent the outer margin thereof and may be secured to the valve body by suitable screws, such as self-tapping screws 37, 37. The closure cap 36 has an armature guide 39 extending therefrom having a spring biased armature 40 guided therein. The armature 40 is biased into engagement with a central orifice 41 extending through the diaphragm 18. A solenoid coil 42 is shown as encircling the armature guide 39 to move the armature 40 against its spring bias when energized to open the central orifice 41 of the valve 18. The diaphragm valve 18 has the usual bleeder passageway (not shown) extending therethrough to pass water from one side of the diaphragm to the other and create a pressure differential on both sides of said diaphragm when the central orifice 41 is closed by the armature 40 to close the valve. Upon energization of the electromagnetic coil 42, the armature 40 will move out of engagement with the central orifice 41, relieving pressure from the outer side of the diaphragm 18 and effecting opening of said valve by the pressure of fluid on the underside thereof.

When the diaphragm valve 18 is open, liquid under pressure will flow from the passageway 32 through the central passageway 33 and out through the by-pass passageway 34 and outlet 15.

The outlet from the mixing chamber 14 is shown in Figures 3, 7, 8 and 9 as comprising an outlet port 45 leading from the mixing chamber 14 and communicating with a passageway 46 leading to the inlet side of the diaphragm valve 17. The valve 17 is like the valve 18 previously described and has a central orifice 47 leading through the diaphragm and closed by a spring biased armature 49, opened upon the energization of a solenoid (not shown) like the solenoid 42. The diaphragm 17 is recessed at its periphery within the end of the valve body and is retained thereto by a cap and closure member 50, which also forms the guide for the armature 49. When the armature 49 is disengaged from the orifice 47 and the valve 17 is open, mixed water will pass from the passageway 46 through an outlet passageway 51 of the valve, communicating with a passageway 52 extending around the outer side of the wall of the mixing chamber 14 and leading to the outlet 15 for discharging mixed water therefrom.

Hot and cold water pass directly to the metering chamber 13 for passage into the mixing chamber, and the mixed water passes from the mixing chamber under the control of the solenoid operated valve 17, while hot water may be by-passed around the mixing chamber 14 to the outlet 15 under the control of the solenoid operated valve 18.

A means is provided for metering hot and cold water into the metering chamber 13, for passage into the communicating mixing chamber 14, which is herein shown as comprising a piston valve 53 having a central rib 54 extending around its periphery, recessed to receive a sealing ring 55, engaging the wall of the metering chamber 13, and separating the hot and cold water inlet ports 27 and 24, respectively.

The piston valve 53 is shown as having a central spider 56 open for the passage of fluid therethrough and having a central socket 57 for a piston 59 of a thermo-responsive element 60. A guide plunger 61 is shown as extending from the outer wall of the spider defining the socket 57, and as being slidably guided in a guide 63 formed in the end wall 19 of the casing 10.

An insert sleeve 65, having an inwardly extending annular flange 66 at the inner or lower end thereof is shown as being mounted within the mixing chamber 14. The sleeve 65 is shown as having a bead 67 extending vertically therealong for engagement with a recess 68 formed in the wall of the mixing chamber 14. The bead 67 and recess 68 serve to align an outlet opening 69 through said retainer sleeve with the mixed water outlet 45. The side of the annular flange 66 facing the valve piston 53 forms a seat for one end thereof, to block the passage of cold water into the mixing chamber 14 when the valve piston is in engagement with said seat. The end wall 19 of the metering chamber 13 forms a seat for the opposite end of the valve piston 53 to block the passage of hot water into the mixing chamber 14 when the valve piston 53 is in engagement with said seat.

A spring 70 seated within an annular recess 71 of the end wall 19 of the metering chamber 13 is shown as encircling the socket 57, and as engaging the spider 56, to bias the valve piston into engagement with its seat formed by the annular flange 66. The plunger 59 of the thermostatic element 60 is shown as moving the valve piston 53 against the bias of the spring 40 into position to admit hot and cold water into the mixing chamber 14 around both ends of the piston valve 53 and to block the passage of hot water into the mixing chamber 14 when the temperature of the mixed water exceeds the predetermined desired temperature.

The thermostatic element 60 may be of the so-called power element type wherein a deformable medium (not shown) carried in a casing 73 for the element acts against a membrane or deformable member (not shown), to extend the piston 59 from a cylinder 74 of the thermostatic element. The casing 73 is herein shown as being encircled by a ring 75 bearing against the inner face of a retainer 76, through which the casing 73 extends. The retainer 76 has an annular flanged portion 77 engaging the opposite side of the annular flange 66 from the piston valve 53 and retained in engagement therewith by an over-travel or safety release spring 78, interposed between the flange 77 and the inside of the cover 21. The over-travel spring 77 is sufficiently strong to normally maintain the retainer 76 into engagement with the flange 66, but yields upon excessive temperature conditions when the plunger 59 may be extended from the cylinder 74 beyond a predetermined safe distance.

The retainer 76 is shown as having a segmental fluid passageway 79 leading through a frusto-conical wall 80 thereof. The passageway through the wall 80 of the retainer 76 is on the opposite of the mixing chamber 14 from the outlet 45. The wall 80 thus serves as a baffle to flow the mixed water over the thermostatic element 60 and casing 73 thereof as it flows for discharge through the port 45 and diaphragm valve 17.

A check valve 85 is shown in Figures 1, 10 and 11 as being mounted in the hot water inlet 11 in the passageway 26 to the metering chamber 13, to block the passage of cold water from said metering chamber into the hot water inlet 11. The check valve 85 is herein shown as being a flexible disk or wafer-type of check valve comprising a flexible wafer 86 which also forms a seal around the passageway 26. The wafer 86 is shown as being of a generally semi-circular form, conforming to the cross-section of the hot water inlet passageway 26 and as having an arcuate generally semi-circular slot 87 formed therein, through which extends an arcuate rib 88 of a valve seat member or frame 89.

The open end of the inlet passageway 26 is shown as being shouldered and as having an inclined shouldered edge 90 extending along the partition 25 and opening toward the passageway 26. The arcuate portion of the passageway 26 is also shown as having a shoulder 91 extending therearound with an inwardly inclined inner wall and an inner downwardly stepped shoulder 93, engaged by the arcuate rib 88. The disk frame and seat member 89 is shown as having an annular outer periphery fitting within the hot water inlet 11, and as having a segmental flow passageway 95 leading therethrough and accommodating the flow of water to the by-pass passageway 30. The seat frame 89 also has by-pass passageways 96 and 97 leading therethrough and abutted by the flexible wafer or disk 86 when back pressure acts on the wafer 86, to block the back flow of cold water into the inlet 11. The flexible wafer or disk 86 is also shown as being recessed on its bottom as indicated by reference characters 99 and 100 to conform to the inclined shouldered portions 90 and 91 in the partition 25 and the wall of the inlet 26.

When the seat frame 89 is inserted within the inlet 11, with the rib 88 extending through the arcuate slot 87 of the wafer 86, the recessed portions 99 and 100 are pressed into engagement with the shouldered portions 90 and 91 of the inlet 26, to seal said seat frame to said inlet.

The seat frame or cage 89 is shown as being retained within the inlet 11 by a splined retainer ring 101. The splines of the retainer ring cooperate with corresponding splines 103 formed in the inlet 11, but stopping short of the inner end thereof. The splined retainer ring 101 is thus inserted within the inlet along the splines 103 into engagement with the outer edge of the seat frame or cage 89, and given a slight turn to position the splines thereof beneath the inner edges of the splines 103, 103, and retain the seat frame 89 and wafer 86 in position within the passageway 26. The flexible wafer 86 pressed into engagement with the shoulder portions 90 and 91 of the inlet 26 forms an effective seal between the seat frame 89 and the end of said inlet.

Water flowing through the passageways 96, 96 and 97 of the frame 89, will hinge the wafer 86 out of engagement with said flow passageway inwardly along the passageway 26, about the recessed portion 99 thereof. The backflow of fluid however, will tightly engage said wafer with the seat formed by the inner wall or surface of the seat frame or cage 89, to block the backflow of fluid from the inlet 26 back into the inlet 11.

The inlet 11 is shown as having a strainer 105 therein. A similar strainer (not shown) may be provided in the inlet 12. The strainer 105 is shown as being of a hat-like form, having a backwardly turned rim 106 extending along the wall of the inlet and retained to said inlet by pressing against the wall thereof.

An outlet fitting 107 is shown as having a flange 109 recessed within the end of the outlet 15 of the valve body, and as being sealed thereto as by a sealing ring 110. The outlet fitting 107 may be secured to the valve body 10 as by self-tapping screws (not shown). The inner wall of the flange 109 forms a shoulder for a flow control annulus 111, for effecting a uniform flow of fluid through the outlet of the valve regardless of pressure variations. The shoulder or inner side of the flange 109 is shown as terminating into two adjoining frusto-conical surfaces 112 and 113 within which the annulus 111 may flex, as the pressure acting thereagainst increases, to reduce the delivery area of the orifice through said annulus, as in Patent No. 2,454,929, which was issued to Leslie A. Kempton on November 30, 1948. The flow control annulus 111 may be varied to attain the desired delivery volume of fluid from the valve.

It may be seen from the foregoing that a novel and improved form of mixing valve of a one-piece construction has been provided, particularly adapted to be molded from a thermoplastic material, wherein the hot and cold water are both delivered directly into a metering chamber and a thermostatically controlled piston valve meters the hot and cold water for mixture within a mixing chamber.

It may further be seen that the control of mixed water from the mixing chamber is from a solenoid controlled pressure operated valve, and that the hot water inlet is provided with a partition, by-passing hot water to a second solenoid controlled valve, controlling the flow of hot water directly to the outlet of the valve.

It may still further be seen that the retainer for the thermostatic element also serves as a baffle, to baffle mixed water over the casing of the thermostatic element, and that a safety or over-travel spring is spaced from the biasing spring of the valve within the mixing chamber, and retains the retainer and thermostatic element within the mixing and metering chambers of the valve and yields upon excessive extension of the thermostatic element.

It may still further be seen that a novel and improved form of check valve has been provided wherein the check valve forms a seal for the inlet passageway, sealing said passageway when checking said passageway against the backflow of fluid therethrough.

It will be understood that modifications and variations may be effected without departing from the scope of the novel concepts of the present invention.

We claim as our invention:

1. In a mixing valve for tempering hot water, a hollow valve body open at opposite ends thereof and having a mixing chamber having a cylindrical wall, each open end of said valve body having an outer annular passageway leading into said valve body and a concentric port leading into said valve body within said annular passageway, two spaced inlets leading into said valve body between the open ends thereof, one of said inlets leading directly into said mixing chamber through the cylindrical wall thereof, the other of said inlets leading directly into said mixing chamber through the cylindrical wall thereof in axially spaced relation along said wall with respect to the first of said inlets and also having a flow passageway leading to one annular passageway in one open end of said valve body, the axis of said cylindrical wall extending parallel to the open ends of said valve body and perpendicular to a common plane containing the axes of said inlets, a flow passageway from said mixing chamber to the annular passageway in the other open end of said valve body, a fluid flow passageway leading along the outside of said mixing chamber and connecting said ports together, and an outlet from said fluid flow passageway.

2. In a mixing valve for tempering hot and cold water, a hollow valve body open at opposite ends thereof and having a mixing chamber having a cylindrical wall, each open end of said valve body having an outer annular passageway leading into said valve body and a concentric port within said annular passageway leading into said valve body and separated from said mixing chamber by said cylindrical wall, two inlets leading into said valve body between the open ends thereof, one of said inlets leading directly into said mixing chamber through the wall thereof, the other of said inlets leading directly into said mixing chamber through the wall thereof, the axis of said cylindrical wall extending parallel to the planes of the open ends of said valve body and perpendicular to a plane containing the axes of said inlets, a flow passageway from said second mentioned inlet to an annular passageway in one open end of said valve body, a flow passageway from said mixing chamber to an annular passageway in the other open end of said valve body, valve means closing the opposite open ends of said valve body and selectively operable by the pressure of fluid thereon to afford a passageway from each annular passageway through each associated concentric port, an outlet from said valve body, and a flow passageway having communication with said ports and said outlet.

3. In a mixing valve for tempering hot water, a hollow valve body open at opposite ends thereof and having a mixing chamber therein having a cylindrical wall, each open end of said valve body having an outer annular passageway leading thereinto and a concentric port within said annular passageway leading into said valve body and separated from said mixing chamber by said cylindrical wall, two spaced inlets leading into said valve body between the open ends thereof, one of said inlets leading directly into said mixing chamber through the wall thereof, the other of said inlets leading directly into said mixing chamber through the wall thereof in axially spaced relation with respect to the opening of said one inlet into said mixing chamber, the other of said inlets also having a flow passageway by-passing said mixing chamber and having communication with one annular passageway opening to one open end of said valve body, a flow passageway from said mixing chamber to an annular passageway opening to the other end of said valve body, the axis of said cylindrical wall extending parallel to planes extending along the open ends of said valve body and perpendicular to a plane containing the axes of said inlets, solenoid controlled pressure operated valve means closing the open ends of said valve body and selectively operable to afford communication from said annular passageways to said ports, a fluid flow passageway connecting said ports together and an outlet from said fluid flow passageway, valve means within said mixing chamber metering hot and cold water thereinto, and a thermostatic element within said mixing chamber for operating and controlling operation of said valve means.

4. In a mixing valve for delivering water at various selected temperatures, a one piece molded valve body having first, second, third, fourth, fifth and sixth faces angularly disposed with respect to each other and having a generally cylindrical mixing chamber therein opening to a first face of said valve body and axially extending substantially therethrough and closed at its inner end by the inner wall of a second face of said valve body, hot and cold water inlets leading into said valve body through a third face thereof, an outlet from said valve body through a fourth face thereof opposite said third face, passageways in said valve body from said hot and cold water inlets respectively communicating with said mixing chamber through ports in the cylindrical wall thereof spaced from each other circumferentially and axially of said mixing chamber, a passageway in said valve body from said hot water inlet opening to a fifth face of said valve body, a passageway in said valve body leading from a port in the cylindrical wall of said mixing chamber and opening to a sixth face of said valve body opposite said fifth face, a hollow piston valve in said mixing chamber having annular valve faces at opposite ends thereof, said valve body having an annular hot water valve seat at the inner end of said mixing chamber for cooperation with the valve face on one end of said piston valve to control flow of hot water into said mixing chamber, a generally cylindrical insert in said mixing chamber providing an annular cold water valve seat spaced from said hot water valve seat a greater distance than the length of said piston valve for cooperation with the valve face on the other end of said piston valve to control flow of cold water into said mixing chamber, a spring seated on said valve body at the inner end of said mixing chamber within said hot water valve seat and operatively associated with said piston valve to bias said piston valve away from said hot water valve seat, a thermally responsive element in said mixing chamber in sensing relation with mixed water therein and operatively associated with said piston valve to move said piston valve toward said hot water valve seat upon predetermined increases in the temperature of the mixed water, a cover plate secured to said valve body on said first face thereof for closing the outer end of said mixing chamber, the axis of said mixing chamber extending parallel to said fifth and sixth faces of said valve body and perpendicular to a plane containing the axes of said inlets, ports in said valve body communicating with said outlet and respectively opening to said fifth and sixth faces of said valve body, and independently operable solenoid controlled pressure operated diaphragm valves covering the ends of said passageways and ports opening to said fifth and sixth faces of said valve body and operable singly and in combination to supply water at various selected temperatures through said outlet.

References Cited in the file of this patent

UNITED STATES PATENTS

| | | |
|---|---|---|
| 1,795,333 | Fleming | Mar. 10, 1931 |
| 1,962,214 | Russell et al. | June 12, 1934 |
| 2,378,613 | Young | June 19, 1945 |
| 2,558,962 | Kempton | July 3, 1951 |
| 2,620,134 | Obermaier | Dec. 2, 1952 |
| 2,631,781 | Dillman | Mar. 17, 1953 |
| 2,647,692 | Keller | Aug. 4, 1953 |
| 2,670,900 | Branson | Mar. 2, 1954 |
| 2,672,157 | Branson | Mar. 16, 1954 |
| 2,712,324 | Lund | July 5, 1955 |